Feb. 19, 1924.  1,484,540

H. WITZ

HIGH PRESSURE WATER TUBE BOILER

Filed March 5, 1923    4 Sheets-Sheet 1

Inventor:
Henry Witz
by Gifford, Bull & Scull
Attorneys

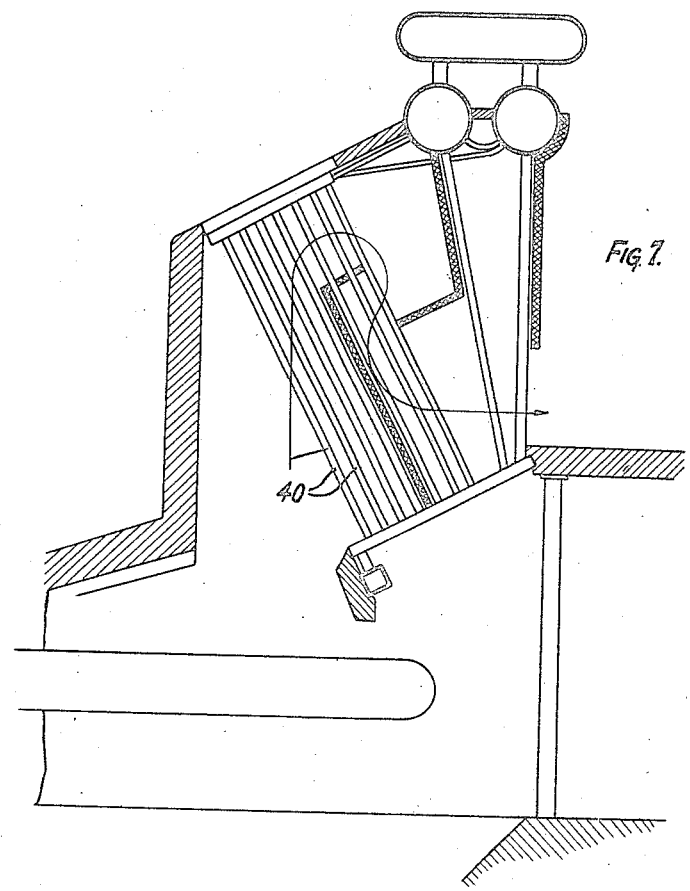
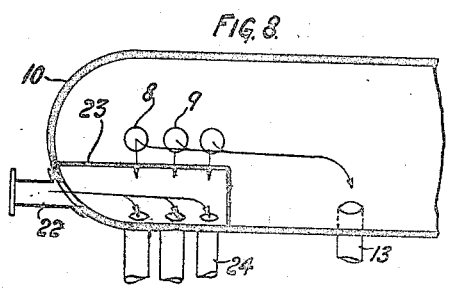
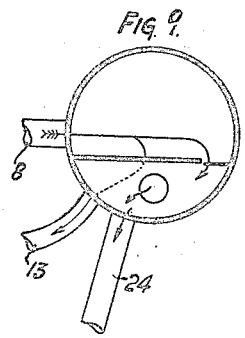

Patented Feb. 19, 1924.

1,484,540

UNITED STATES PATENT OFFICE.

HENRY WITZ, OF OBERHAUSEN, GERMANY, ASSIGNOR TO BABCOCK & WILCOX COMPANY, OF NEW YORK, N. Y.

HIGH-PRESSURE WATER-TUBE BOILER.

Application filed March 5, 1923. Serial No. 622,966.

*To all whom it may concern:*

Be it known that I, HENRY WITZ, a subject of the German Empire, and resident of Oberhausen, Rhineland, Germany, have invented a certain new and useful Improvement in High-Pressure Water-Tube Boilers.

The employment of high pressure steam, for example of 50 to 60 atmospheres, unfortunately necessitates the employment of comparatively small water spaces as otherwise the walls would have to be too thick and manufacture would be rendered very difficult.

In order to overcome this difficulty I preferably provide a plurality of interconnected, upper, transverse drums which can be made of relatively small diameter and hence of comparatively thin walls. In the case of boilers of the Babcock & Wilcox type, to which my invention particularly relates, I preferably divide the bank of water tubes into groups and return the steam generated in a given group to a single drum only, whereby different groups may serve somewhat different functions and a given drum may be joined by proportionately fewer tubes and the strength of such drums thereby increased.

Several embodiments of the invention applied to a water-tube boiler with sectionalized headers are illustrated in the accompanying drawings, in which—

Fig. 1 shows a vertical longitudinal section, and

Fig. 2 a horizontal section of the first embodiment.

Fig. 7 shows the application of the invention to water tube boilers with substantially vertical water-tubes.

Figs. 8 and 9 show the longitudinal and cross sections through an arrangement for ensuring a definite water circulation.

Figure 1:
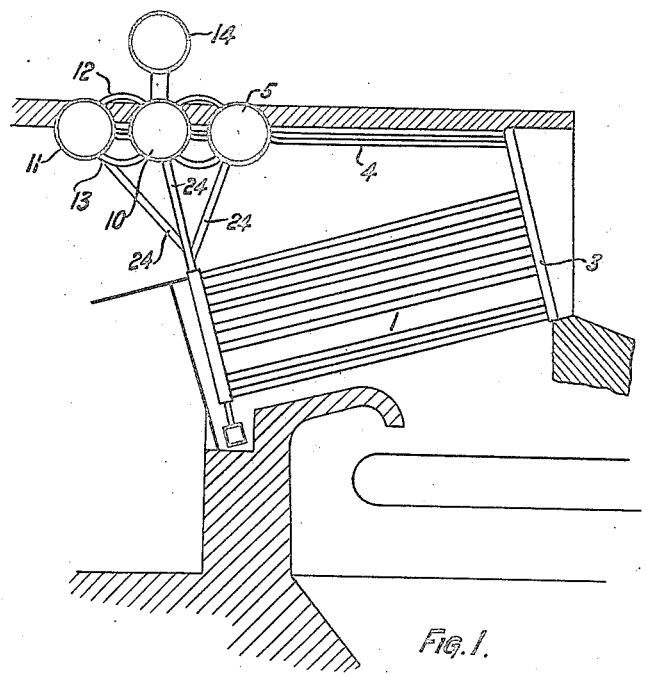
Figure 2:
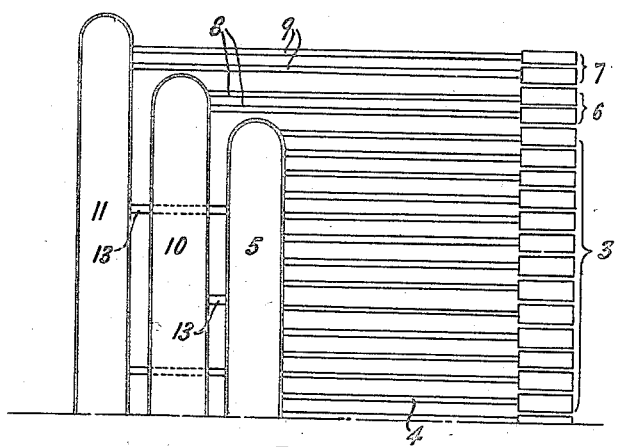

Referring to Fig. 1, 1 is the known water-tube system with sectional headers. The central headers 3 are connected in a manner known per se by upper tubes 4 with a drum 5 from which the water passes to the tubes 1 again through downtake tubes 24. The outer headers 6 and 7 are connected by steam and water return tubes 8 and 9 respectively with two additional drums 10 and 11. The steam and water spaces of the drums are interconnected by means of tubes 13, while on the middle drum is mounted a steam collector 14.

By means of this distribution of the water-tubes among several drums it is possible to employ drums of comparatively small diameter, so that the thicknesses of the walls remain within reasonable limits and manufacture does not present too great difficulties, in spite of which, due to the provision of a plurality of drums, a sufficient water content is afforded.

In the foregoing embodiments groups of tubes 8' and 9' serve mainly to heat the water up to the high evaporation temperature contemplated by this type of boiler, while tubes 1, which are heated iefly by direct radiation, serve mainly for producing steam from the water thus heated.

Figure 3:
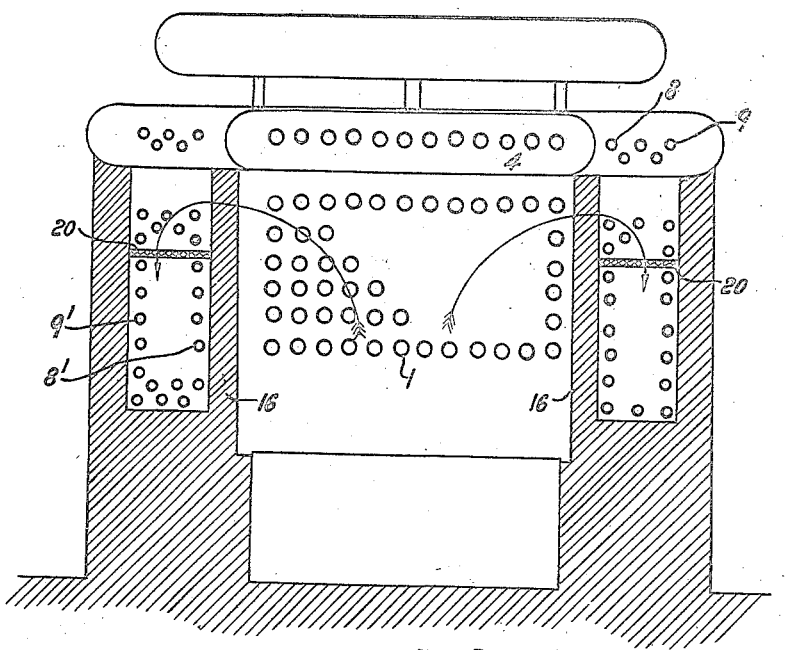
Figs. 3 and 4 are respectively a vertical cross section and longitudinal section and show the particular mode of conducting the furnace gases, Figure 4 showing a slightly modified form using one less drum.
Figure 4:
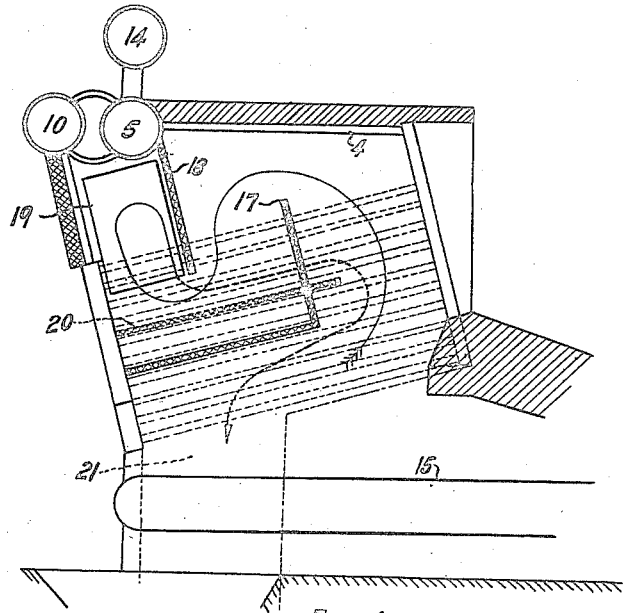

In view thereof special modification of the furnace is desirable as shown in Figs. 3 and 4 i. e. the mechanical grate 15 is arranged centrally of the boiler, i. e. beneath the water-tubes 4 which are connected to the headers 3. The water-tubes 8' and 9' connected with the drum 10, are separated from the tubes 4 by partition walls 16. The furnace gases are first led over the tubes 1 in the direction of the arrow by means of bafles 17, 18 built into the furnace prop . (The tubes 1 are omitted from Fig. 4 f r the sake of clearness.) The furnace gas s then pass at the rear end of the furnace, through openings 19 in the walls 16, into the chambers containing the water-tubes 8', 9', which chambers are sub-divided by partition walls 20, so that the furnace gases flow over the water-tubes 8', 9' in the direction shown by the arrows and then pass to the economizer through a duct 21, where they heat the feed water in known manner.

In order to ensure that the feed water supplied passes only through the groups of tubes 8' and 9', suitable baffles are built into the drum 10, as shown in longitudinal section in Fig. 8 and in cross-section in Fig. 9.

Feed is effected through a connection 22, arranged in the end of the drum 10 and the feed water passes to a box 23 with an opening in the top plate and the inner side closed, which is arranged above the downtake tubes 24. The rear side of the box is open.

The circulation will then be as follows:—

The feed water introduced passes, by means of the downtake tubes 24, through the groups of tubes 8', 9' and arrives, in highly heated condition, back over the upper side of the box 23 and thence passes through the tubes 13 into the main evaporative system 5, 4, 3 (Fig. 1). If the quantity of water circulating and passed on from the groups of tubes 8' and 9' is larger than the quantity of feed water supplied, the quantity of feed water is increased by water, already heated, which can pass to the downtake tubes 24 through the opening in the top of the box 23.

Figure 5:
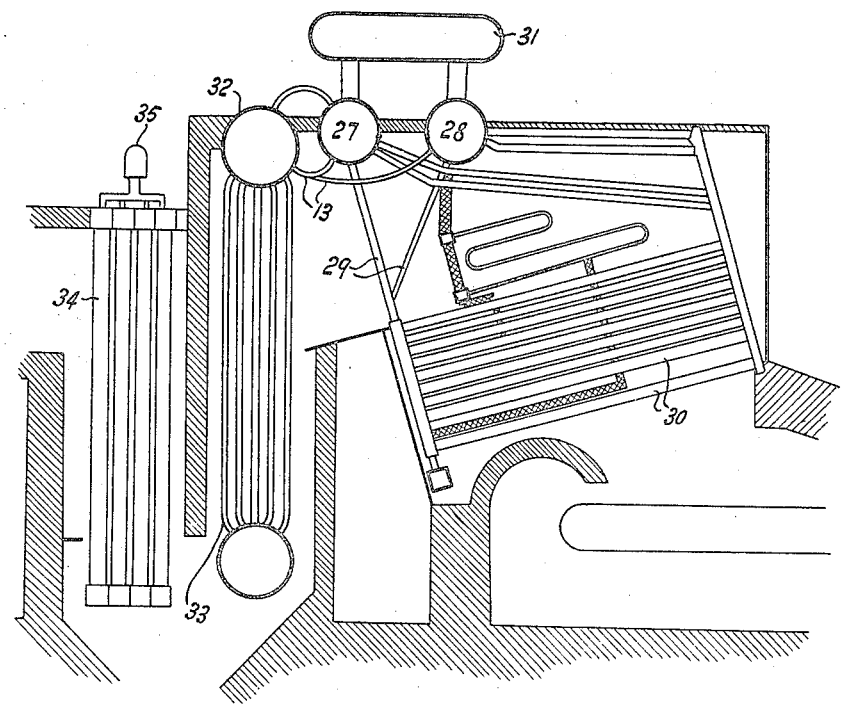
Figs. 5 and 6 show similar sections through the second embodiment.
Figure 6:
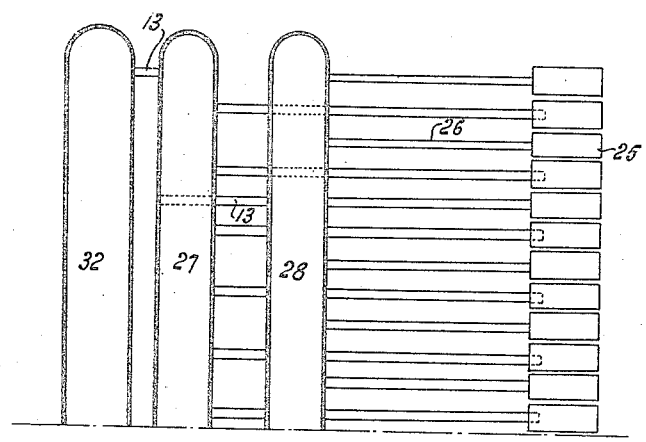

The embodiment illustrated in Figs. 5 and 6 provides for weakening the drum as little as possible by the fitting of tubes therein, so as to be able to keep the thickness of wall as small as possible. For this reason, the headers 25 are alternately connected by means of the steam and water return tubes 26 with two drums 27, 28 and the latter are alternately connected by means of downtake tubes 29 with the individual water-tube systems 3; consequently, where, as in this instance, only two drums are provided, the weakening thereof by the introduction of tubes will be reduced by half. If the water-tube systems are distributed among three drums, the weakening effect would be reduced to a third.

It is thus possible while retaining the same drum diameter to make the thickness of wall smaller or, with the same thickness of wall, to increase the diameter of the drum and thus the volume of the water content.

The steam spaces of the drums 27 and 28 are interconnected by means of a steam dome 31, while their water spaces are connected with the drum 32 of a vertical tube boiler 33, constructed in known manner, from which the feeding of the drums 27 and 28 is effected. The vertical tube system 33 receives the feed water from an economizer 34, in which water is suitably heated and from which the air is eliminated by means of a known device 35.

In Fig. 7 an arrangement is shown having a system of steam returns similar to that shown in Figs. 5 and 6, in which the water-tubes are arranged substantially vertically, in order to effect a possible acceleration of the circulation.

The invention is, of course, obviously applicable to ordinary water-box tubular boilers.

I claim:—

1. In a steam boiler, a bank of inclined water tubes vertically divided into groups, said tubes being connected at either end by headers, a plurality of transverse, interconnected drums, steam and water returns and water downtakes connecting said drums with said headers, each group of tubes being connected by said steam and water returns to a single drum other than a drum to which any other group is connected and alternate headers being connected by said returns with different drums.

2. In a steam boiler, a bank of inclined water tubes vertically divided into groups, said tubes being connected at either end by headers, a plurality of transverse, interconnected drums and of approximately the same size, steam and water returns and water downtakes connecting said drums with said headers, each group of tubes being connected by said steam and water returns to a single drum other than a drum to which any other group is connected and alternate headers being connected by said returns with different drums.

3. In a steam boiler, a bank of inclined water tubes vertically divided into groups, said tubes being connected at either end by headers, a plurality of transverse, interconnected steam and water drums, steam and water returns and water downtakes connecting said drums with said headers, each group of tubes being connected by said steam and water returns to a single drum other than a drum to which any other group is connected and alternate headers being connected by said returns with different drums, a drum connected with and rearward of said steam and water drums and constituting essentially a water drum, a mud drum beneath said water drum and water tubes connecting said mud drum and said water drum in the path of the furnace gases.

4. In a steam boiler a bank of inclined water tubes vertically divided into groups, the vertical rows in each group of tubes being connected at either end by individual downtake and uptake headers, a plurality of transverse interconnected steam and water drums, water connections leading downwardly from said drums to the downtake headers and steam and water connections leading from the top of the uptake headers to two of said drums, the steam and water connections to each of said drums coming from alternate headers so that they enter said drums at distances apart in the longitudinal direction of the drums which are twice the distance between the centers of adjacent headers.

In testimony whereof I have signed my name to this specification in the presence of two subscribing witnesses.

HENRY WITZ.

Witnesses:
HENRY W. HAAS,
ERIC ROONEY.